United States Patent [19]

Ikeda et al.

[11] Patent Number: 5,623,688
[45] Date of Patent: Apr. 22, 1997

[54] PARALLEL PROCESSING SYSTEM INCLUDING INSTRUCTION PROCESSOR TO EXECUTE INSTRUCTIONS AND TRANSFER PROCESSOR TO TRANSFER DATA FOR EACH USER PROGRAM

[75] Inventors: Masayuki Ikeda; Shigeru Nagasawa; Naoki Shinjo; Teruo Utsumi; Masami Dewa; Haruhiko Ueno; Kazushige Kobayakawa; Kenichi Ishizaka, all of Kawasaki, Japan

[73] Assignee: Fujitsu Limited, Kawasaki, Japan

[21] Appl. No.: 520,231

[22] Filed: Aug. 28, 1995

Related U.S. Application Data

[63] Continuation of Ser. No. 165,715, Dec. 13, 1993, abandoned.

[30] Foreign Application Priority Data

Dec. 18, 1992 [JP] Japan .................................. 4-339093

[51] Int. Cl.⁶ ..................................... G06F 15/00
[52] U.S. Cl. .................. 395/800; 364/DIG. 1; 364/230; 364/242.3; 395/842
[58] Field of Search .............................. 395/800, 200.09, 395/200.05, 200.01, 480, 827, 841, 842

[56] References Cited

U.S. PATENT DOCUMENTS

| H586 | 2/1989 | Kun ............................................ 370/94 |
|------|--------|---------|
| 4,768,190 | 8/1988 | Giancarlo ................................ 370/86 |
| 4,942,574 | 7/1990 | Zelle ..................................... 370/85.15 |
| 5,121,390 | 6/1992 | Farrell et al. .......................... 370/94.1 |
| 5,136,718 | 8/1992 | Haydt ....................................... 395/800 |
| 5,212,778 | 5/1993 | Dally et al. ............................. 395/400 |
| 5,301,287 | 4/1994 | Herrell et al. .......................... 395/400 |
| 5,414,840 | 5/1995 | Rengarajan et al. ..................... 395/600 |
| 5,434,975 | 7/1995 | Allen ....................................... 395/200 |
| 5,467,459 | 11/1995 | Alexander et al. ..................... 395/480 |

FOREIGN PATENT DOCUMENTS 0326164  8/1989  European Pat. Off. .

OTHER PUBLICATIONS

IBM Technical Disclosure Bulletin, vol. 34, No. 1, Jun. 1991, New York, U.S., pp. 196–199, 'Programmable address Translation for Multi-processor Systems'.

Primary Examiner—Mehmet B. Geckil
Attorney, Agent, or Firm—Staas & Halsey

[57] ABSTRACT

A parallel processing system including a plurality of processing units each having a main storage storing instructions and data, an instruction processor reading the instructions from the main storage and executing the instructions, and a transfer processor for making a data transfer in units of a packet which is made up of a header and body data. The parallel processing system further includes a network coupling two processing units which are to make the data transfer based on information included in the header of the packet, where the header includes information related to at least a destination of the data, an attribute of a memory access to the main storage and a length of the data. The transfer processor carries out a parallel process for each user process by making a data transfer between the main storage and the network in units of the packet depending on the attribute of the memory access. The transfer processor of at least an arbitrary one of the processing units includes a managing part for managing for each user process a transfer queue base address indicating a first address of a transfer queue in the main storage, a transfer queue write pointer indicating to which data transfer request of the transfer queue the instruction process has enqueued, a transfer queue read pointer indicating to which data transfer request of the transfer queue the transfer processor has finished the data transfer process, and a memory access virtual space.

11 Claims, 16 Drawing Sheets

FIG. 9

2-PROCESS MODE (16 ENTRIES/PROCESS)

(LOCAL ADDRESS) — 115A1

| Index | Entry |
|---|---|
| 0 | USER1 LOCAL PAGE 00 |
| 1 | USER1 LOCAL PAGE 01 |
| 2 | USER1 LOCAL PAGE 02 |
| ... | ... |
| 15 | USER1 LOCAL PAGE 15 |
| 16 | USER0 LOCAL PAGE 00 |
| 17 | USER0 LOCAL PAGE 01 |
| 18 | USER0 LOCAL PAGE 02 |
| ... | ... |
| 31 | USER0 LOCAL PAGE 15 |

(GLOBAL ADDRESS) — 115A2

| Index | Entry |
|---|---|
| 0 | USER1 GLOBAL PAGE 00 |
| 1 | USER1 GLOBAL PAGE 01 |
| 2 | USER1 GLOBAL PAGE 02 |
| ... | ... |
| 15 | USER1 GLOBAL PAGE 15 |
| 16 | USER0 GLOBAL PAGE 00 |
| 17 | USER0 GLOBAL PAGE 01 |
| 18 | USER0 GLOBAL PAGE 02 |
| ... | ... |
| 31 | USER0 GLOBAL PAGE 15 |

FIG. 15
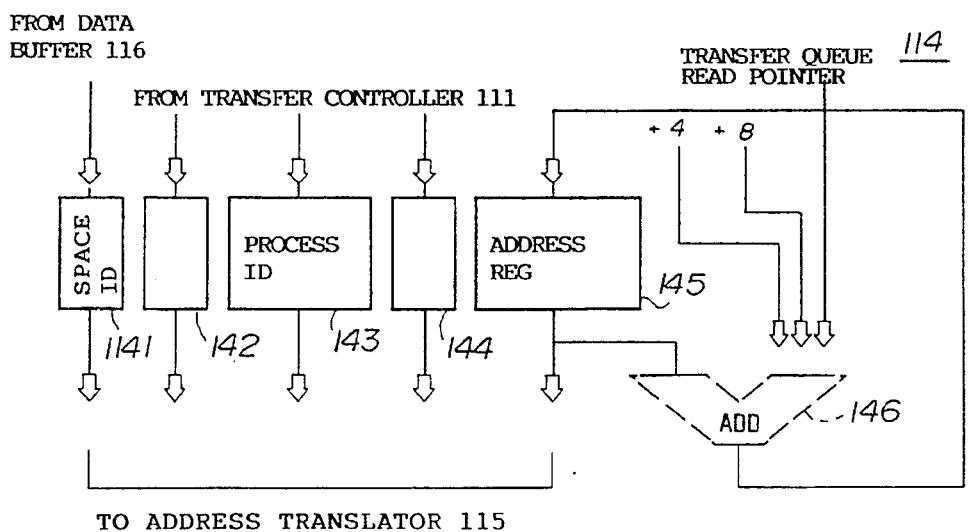
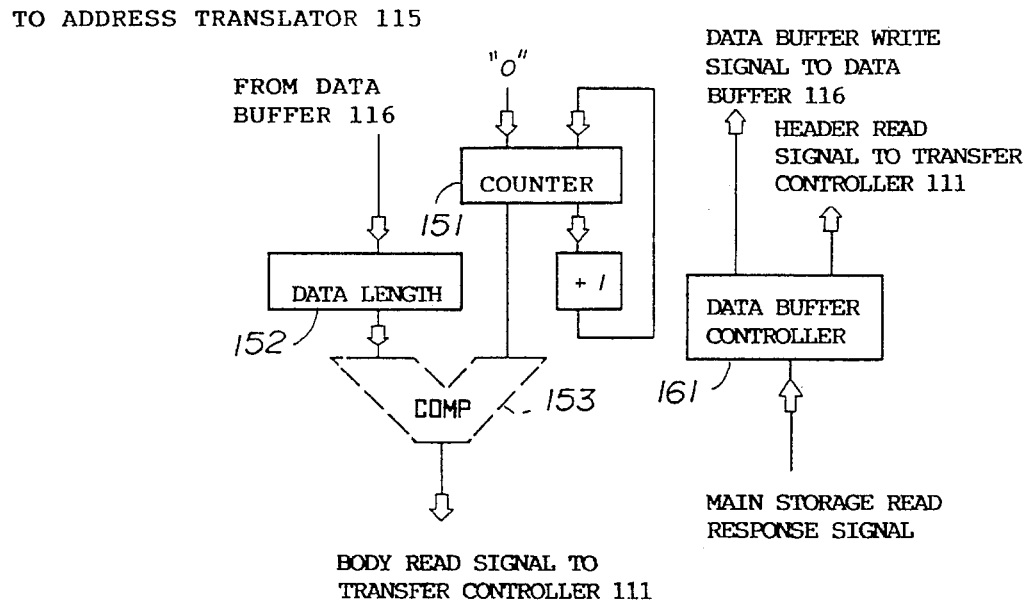

FIG. 16A

| RECEIVING / TRANS-MITTING | WRITE ACCESS (TRANSFER MODE = W) | READ RESPONSE ACCESS (TRANSFER MODE = R) |
|---|---|---|
| G⇔G | PERMITTED | PERMITTED |
| G⇔L | NOT PERMITTED | PERMITTED |
| L⇔G | PERMITTED | NOT PERMITTED |
| L⇔L | NOT PERMITTED | NOT PERMITTED |

FIG. 16B

| RECEIVING / TRANS-MITTING | WRITE ACCESS (TRANSFER MODE = W) | READ RESPONSE ACCESS (TRANSFER MODE = R) |
|---|---|---|
| G⇔G | PERMITTED | PERMITTED |
| G⇔L | PERMITTED | PERMITTED |
| L⇔G | PERMITTED | PERMITTED |
| L⇔L | PERMITTED | PERMITTED |

FIG. 16C

| RECEIVING / TRANS-MITTING | WRITE ACCESS (TRANSFER MODE = W) | READ RESPONSE ACCESS (TRANSFER MODE = R) |
|---|---|---|
| G⇔G | PERMITTED | PERMITTED |
| G⇔L | NOT PERMITTED | PERMITTED |
| L⇔G | PERMITTED | NOT PERMITTED |
| L⇔L | NOT PERMITTED | NOT PERMITTED |

FIG. 16D

| RECEIVING / TRANS-MITTING | WRITE ACCESS (TRANSFER MODE = W) | READ RESPONSE ACCESS (TRANSFER MODE = R) |
|---|---|---|
| G⇔G | PERMITTED | PERMITTED |
| G⇔L | PERMITTED | PERMITTED |
| L⇔G | PERMITTED | PERMITTED |
| L⇔L | PERMITTED | PERMITTED |

PARALLEL PROCESSING SYSTEM INCLUDING INSTRUCTION PROCESSOR TO EXECUTE INSTRUCTIONS AND TRANSFER PROCESSOR TO TRANSFER DATA FOR EACH USER PROGRAM

This application is a continuation of application Ser. No. 08/165,715, filed Dec. 13, 1995, now abandoned.

BACKGROUND OF THE INVENTION

1. Field of the Invention

The present invention generally relates to parallel processing systems, and more particularly to a multi-user parallel processing system which is applicable to a parallel computer system in which a plurality of processing units are connected.

2. Description of the Related Art

In the parallel computer system in which a plurality of processing units are connected, a data transfer which transfers data stored in a main storage of a first processing unit to a second processing unit is carried out relatively frequently. Conventionally, the queuing of the data transfers with respect to the second processing unit is managed by a supervisor program (operating system) of the first processing unit. Accordingly, when the user makes a data transfer request with respect to the supervisor program of the first processing unit, a user program generates an interrupt with respect to the supervisor program, and the supervisor program instructs the data transfer depending on the interrupt.

However, according to the above conventional method, the overhead becomes large because the interrupt is frequently generated by the data transfer request. In addition, no consideration was made to cope with the case where a plurality of users exist.

Hence, it is conceivable to prevent the overhead from becoming large by making the supervisor program intervene every time the data transfer request is made. According to this conceivable method, a write pointer and a read pointer are provided in the queue of the data transfer requests. These pointers are managed directly by the user program, and the access is made with respect to the main storage of each processing unit using one virtual space. The data transfer is made in units of one packet which is made up of a header and body data, where the header includes the destination of the data, the data length and the like. The queue of the data transfer requests corresponds to a list of the headers, and each pointer indicates a position within this list.

However, according to the conceivable method described above, there is only one virtual space which is accessible by the user program. For this reason, an address translation table which is managed by the operating system of each processing unit and is used to translate a logical address into a real address must be rewritten every time the user changes and the user program is switched. In other words, it becomes necessary to load the address translation table every time the user program is switched, and the operating systems of the processing units related to the data transfer must exchange information that is related to the switching of the user program. In addition, because of the need to rewrite the address translation table every time the user program is switched, the user program cannot be switched unless all data transfers related to one user program end.

Therefore, the overhead caused by the switching of the user program is large according to the conceivable method described above, and there is a problem in that the processing performance of the system deteriorates. This problem occurs because of the fact that the conventional parallel computer system is designed on the precondition that one user program is executed for one user, and is not designed for the case where a plurality of users exist and the user program is executed by switching from one user program to another.

SUMMARY OF THE INVENTION

Accordingly, it is a general object of the present invention is to provide a novel and useful parallel processing system in which the problems described above are eliminated.

Another and more specific object of the present invention is to provide a parallel processing system adapted to a parallel computer system, comprising a plurality of processing units each having a main storage storing instructions and data, an instruction processor reading the instructions from the main storage and executing the instructions, and a transfer processor for making a data transfer in units of a packet which is made up of a header and body data, and a network coupling two processing units which are to make the data transfer based on information included in the header of the packet, where the header includes information related to at least a destination of the data, an attribute of a memory access to the main storage and a length of the data. The transfer processor carries out a parallel process by making a data transfer between the main storage and the network in units of the packet depending on the attribute of the memory access. The transfer processor of at least an arbitrary one of the processing units comprises managing means for managing for each user a transfer queue base address indicating a first address of a transfer queue in the main storage, a transfer queue write pointer indicating to which data transfer request of the transfer queue the instruction processor has enqueued, a transfer queue read pointer indicating to which data transfer request of the transfer queue the transfer processor has finished the data transfer process, and a memory access virtual space, and address translation means for carrying out an address translation depending on the memory access virtual space which is specified by the information included in the header of the packet and for issuing an access address with respect to the main storage. The transfer queue is a list of headers of packets. According to the parallel processing system of the present invention, it is unnecessary to end the data transfer related to the user program even when switching the user program because the base address and the pointers of the transfer queue and the memory access virtual space are managed for each user. As a result, it is possible to suppress the overhead at the time of switching the user program to a minimum, and enable efficient parallel execution of a plurality of user programs.

Other objects and further features of the present invention will be apparent from the following detailed description when read in conjunction with the accompanying drawings.

BRIEF DESCRIPTION OF THE DRAWINGS

FIG. 9 shows the construction of the address translation table for a case where the page size is 2 MB and the transfer mode is 2-process mode;

FIG. 15 is a system block diagram showing an embodiment of an access controller of the transfer processor;

FIGS. 16A, 16B, 16C and 16D show tables for determining a space transfer;

DESCRIPTION OF THE PREFERRED EMBODIMENTS

Figure 1:
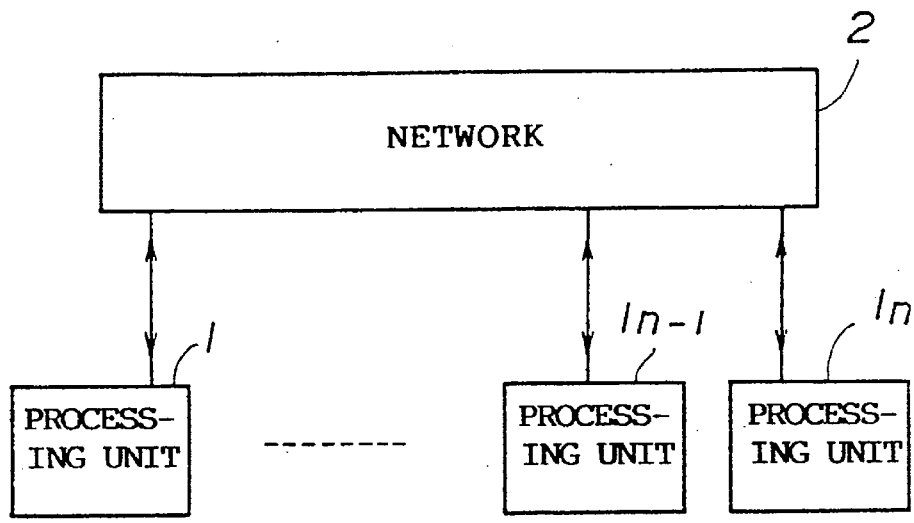
FIG. 1 is a system block diagram showing a parallel computer system to which an embodiment of a parallel processing system according to the present invention may be applied.
Figure 2:
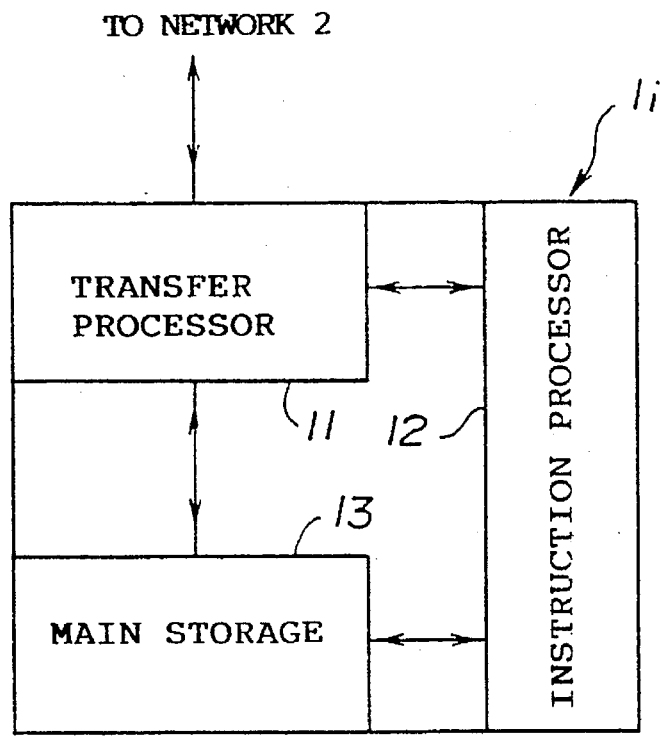
FIG. 2 is a system block diagram showing the construction of a processing unit of the parallel computer system.

FIG. 1 shows a parallel computer system (multi-processor system) which may be applied with an embodiment of a parallel processing system according to the present invention, and FIG. 2 shows the construction of a processing unit of the multi-processor system.

In FIG. 1, the multi-processor system generally includes a plurality of processing units $1_1$ through $1_n$, and a network 2 which connects to these processing units $1_1$ through $1_n$.

Each processing unit $1_i$ is made up of a transfer processor 11, an instruction processor 12, and a main storage 13 which are connected as shown in FIG. 2, where i=1, ..., n. The main storage 13 stores instructions (programs) and data. The instruction processor 12 reads the instructions (programs) from the main storage 13 and executes the instructions. The transfer processor 11 transfers the data between the main storage 13 and the network 2 in units of one packet.

Each packet is made up of a header and body data, and the header at least includes the destination of the data, the attribute of the memory access to the main storage 13, the data length and the like. Accordingly, the network 2 recognizes the destination within the header and carries out a switching so as to connect two processing units which are to make the data transfer. The network 2 may have a known construction which includes a plurality of switching circuits (not shown). In this case, the network 2 switches the switching circuits depending on the destination (that is, the receiving processing unit) within the header of the packet, and if the amount of body data from the source (that is, the transmitting processing unit) is not zero, the network 2 transfers the body data to the destination by referring to the information which indicates the attribute (access ID which will be described later) of the memory access made during the data transfer. In other words, the body data are read from the main storage 13 of the transmitting processing unit and is written into the main storage 13 of the receiving processing unit via the network 2.

Figure 3:
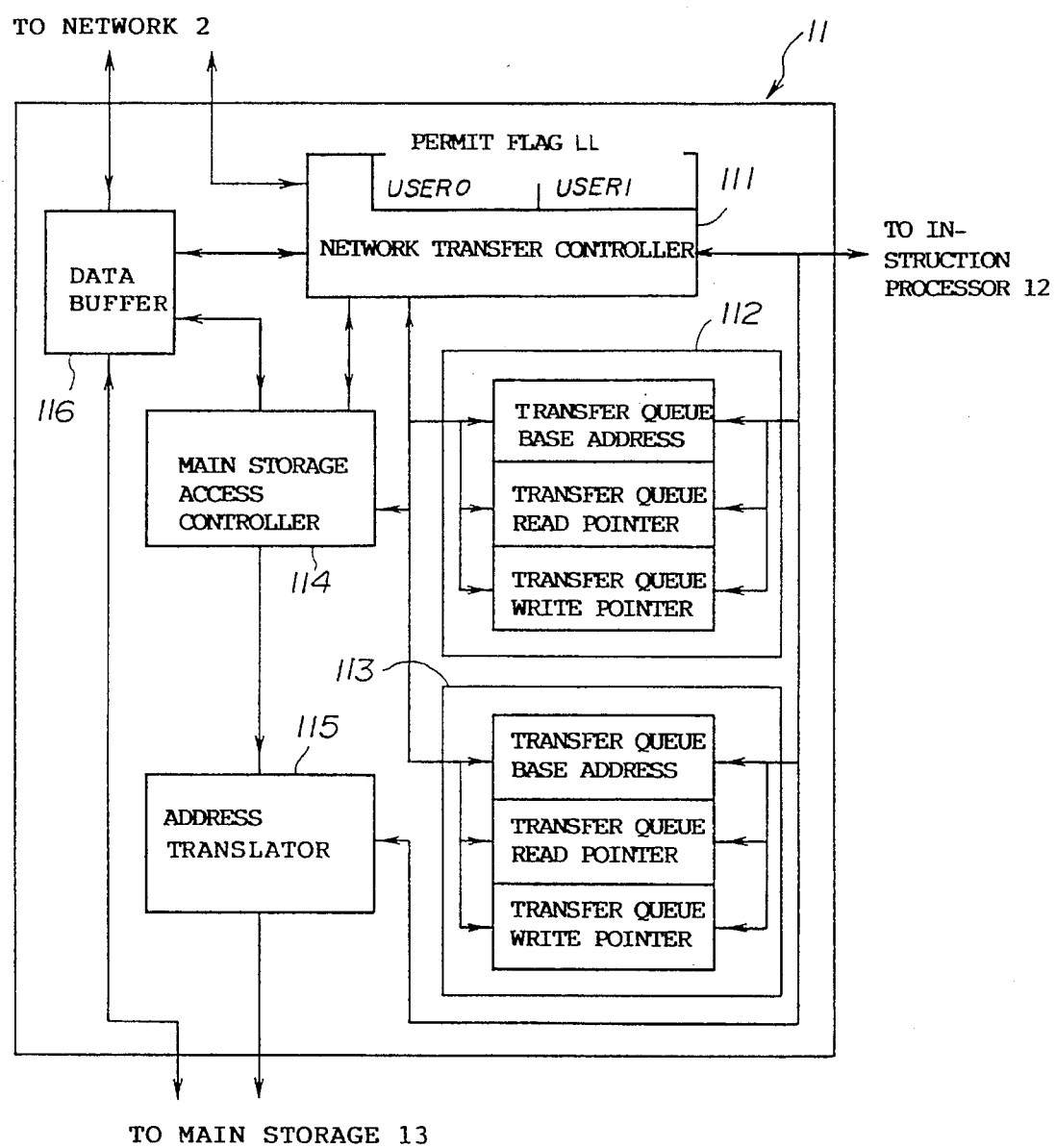
FIG. 3 is a system block diagram showing an embodiment of a transfer processor of the processing unit.

FIG. 3 shows an embodiment of the transfer processor 11. The transfer processor 11 includes a network transfer controller 111, register parts 112 and 113, a main storage access controller 114, an address translator 115, and a data buffer 116.

The register parts 112 and 113 each store a transfer queue base address, a transfer queue write pointer, and a transfer queue read pointer. The transfer queue base address indicates a first address of the transfer queue in the main storage 13. The transfer queue write pointer indicates to which data transfer request of the transfer queue the instruction processor 12 has enqueued. In addition, the transfer queue read pointer indicates to which data transfer request of the transfer queue the transfer processor 11 has finished the data transfer process. The contents of the register parts 112 and 113 can be referred to and updated from the instruction processor 12. Of course, the number of register parts is not limited to 2, and it is possible to provide a number of register parts corresponding to the number of user programs which are to be processed in parallel. In this embodiment, it is assumed for the sake of convenience that the register part 112 is provided with respect to a user USER0, and the register part 113 is provided with respect to a user USER1.

Figure 4:
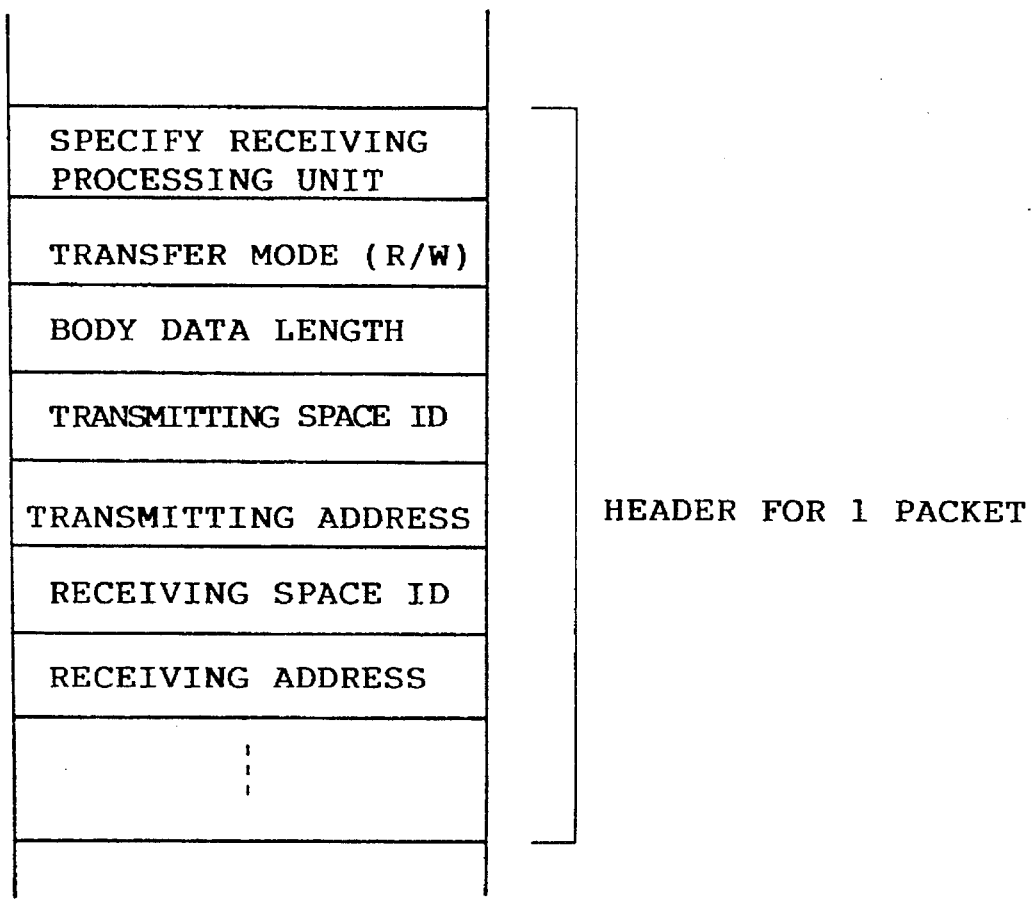
FIG. 4 shows an embodiment of the construction of a transfer queue.

FIG. 4 shows an embodiment of the construction of the transfer queue. FIG. 4 shows the header for 1 packet, and this header includes information which specifies a receiving processing unit, information which indicates whether the data transfer mode is a read/write (R/W), information which indicates the length of the body data, information which indicates a transmission space ID, information which indicates a transmitting address, information which indicates a receiving space ID, information which indicates a receiving address and the like.

In FIG. 3, the network transfer controller (hereinafter simply referred to as a transfer controller) 111 is activated by an instruction from the instruction processor 12, and starts the data transfer process depending on the values of the transfer queue read pointer and the transfer queue write pointer. In addition, the transfer controller 111 issues a main storage access request to the main storage access controller 114 in order to read the header and the body data of the transferring packet. The transfer controller 111 also controls an interface which connects the transfer processor 11 to the network 2, and controls the data transmission from the data buffer 116 to the network 2.

The main storage access controller (hereinafter simply referred to as an access controller) 114 makes an access to the main storage 13 in response to an instruction from the transfer controller 111, and controls the data transfer between the main storage 13 and the data buffer 116.

The address translator 115 carries out an address translation depending on the value of the space ID of the access which is specified by the information included in the header, and issues an access address with respect to the main storage 13.

The data buffer 116 temporarily buffers the data when transferring the data between the main storage 13 and the network 2. In addition, the data buffer 116 temporarily buffers the data when reading and writing data required by the transfer controller 111 and the access controller 114 with respect to the main storage 13.

Figure 5:
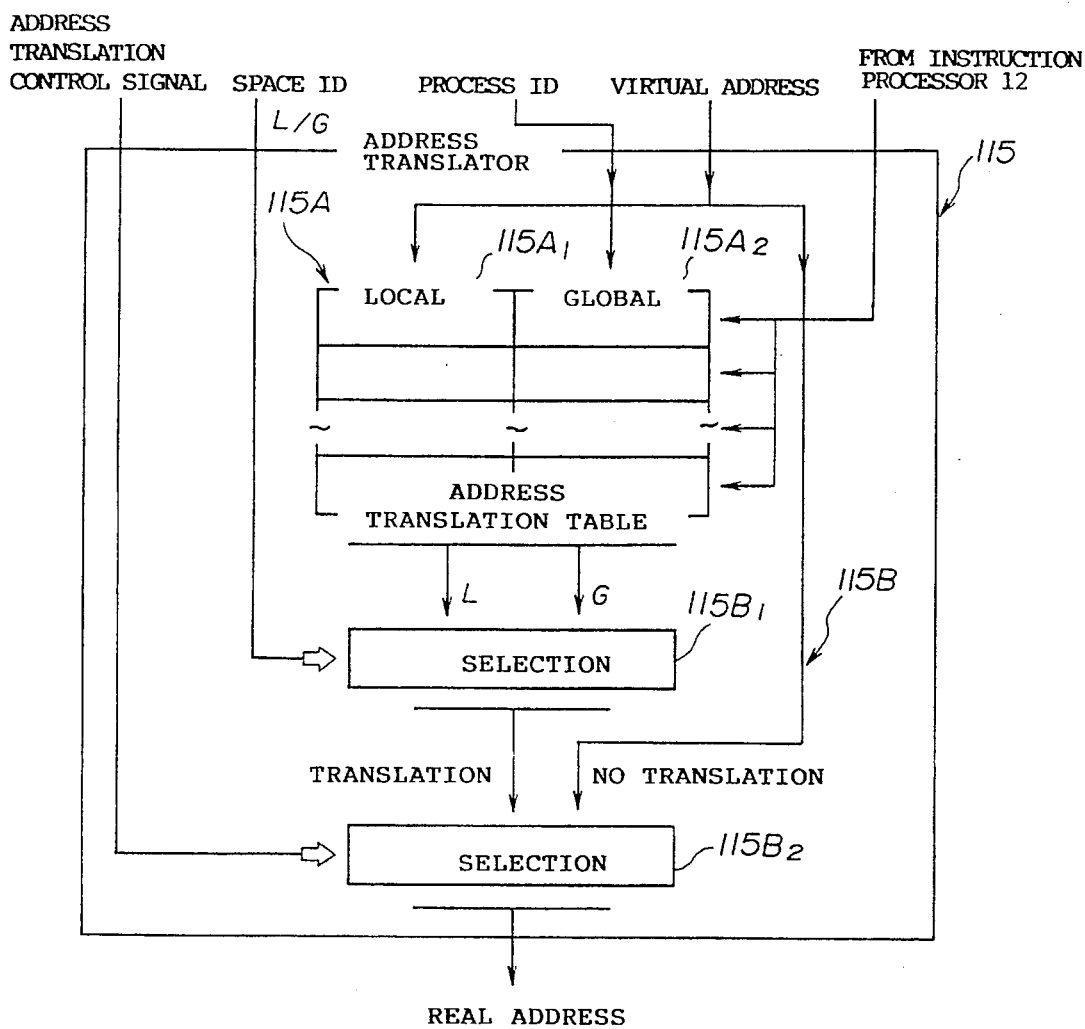
FIG. 5 is a system block diagram showing an embodiment of an address translator of the transfer processor.

FIG. 5 shows an embodiment of the address translator 115. The address translator 115 includes an address translation table 115A to which contents may be written from the instruction processor 12, and a selector 115B which retrieves the contents of the address translation table 115A. The selector 115B is made up of one or more selection circuits, and is made up of 2 selection circuits $115B_1$ and $115B_2$ in this embodiment.

The address translation table 115A is made up of a local address translation table $115A_1$ corresponding to a transmitting space ID=0, and a global address translation table $115A_2$ corresponding to a transmitting space ID=1. The local address and the global address respectively are kinds of virtual spaces for the memory access. By retrieving the contents of the address translation table 115A based on the virtual address obtained from the access controller 114, it is possible to read an entry of the local address translation table $115A_1$ and an entry of the global address translation table $115A_2$.

The space ID which is specified by the transfer controller 111 or the header is supplied to the selection circuit $115B_1$ via the access controller 114. The space ID indicates the kind of address, that is, whether the address is a local address or a global address. Hence, the selection circuit $115B_1$ selectively outputs only one of the local address and the global address output from the address translation table 115A in response to the space ID. On the other hand, an address translation control signal from the transfer controller 111 is supplied to the selection circuit $115B_2$ via the access controller 114. The selection circuit $115B_2$ selectively outputs only one of the translated address output from the selection circuit $115B_1$ and the non-translated address (virtual address) output from the access controller 114 in response to the address translation control signal. The output address of the selection circuit $115B_2$ is supplied to the main storage 13 as a real address which is used when making access to the main storage 13.

In this embodiment, the local address translation table $115A_1$ and the global address translation table $115A_2$ respectively are made up of 32 entries. In a 1-user mode where the number of users is 1, the address translation tables $115A_1$ and $115A_2$ respectively are used with 32 entries per user. In addition, in a 2-user mode where the number of users is 2, the address translation tables $115A_1$ and $115A_2$ respectively are used with 16 entries per user. Hence, even if the number of users is 3 or more, it is possible to reduce the physical quantity of the address translation table by adjusting the number of entries per user as compared to the case where a number of address translation tables corresponding to the number of users are independently provided. The user mode is instructed by a program ID which is obtained from the transfer controller 111 via the access controller 114.

Figure 6:
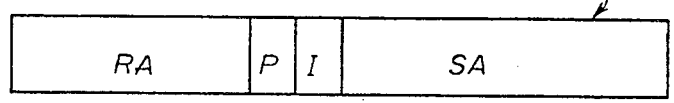
FIG. 6 shows an embodiment of an address translation table.

FIG. 6 shows an embodiment of the address translation table $115A_1$ (or $115A_2$). In FIG. 6, RA denotes a real address which is obtained by translating the virtual address from the access controller 114, P denotes an access protection bit which is used to detect an exception when a write access is made to a region corresponding to the entry, I denotes an invalid bit which is used to detect the exception when an access is made to the region corresponding to the entry, and SA denotes a section address which is used to detect an exception when upper bits of the input virtual address do not match the bits thereof.

Next, a description will be given of the address translation using the local address translation table $115A_1$ when the page size is 2 MB, by referring to FIGS. 7 through 10.

Figure 7:
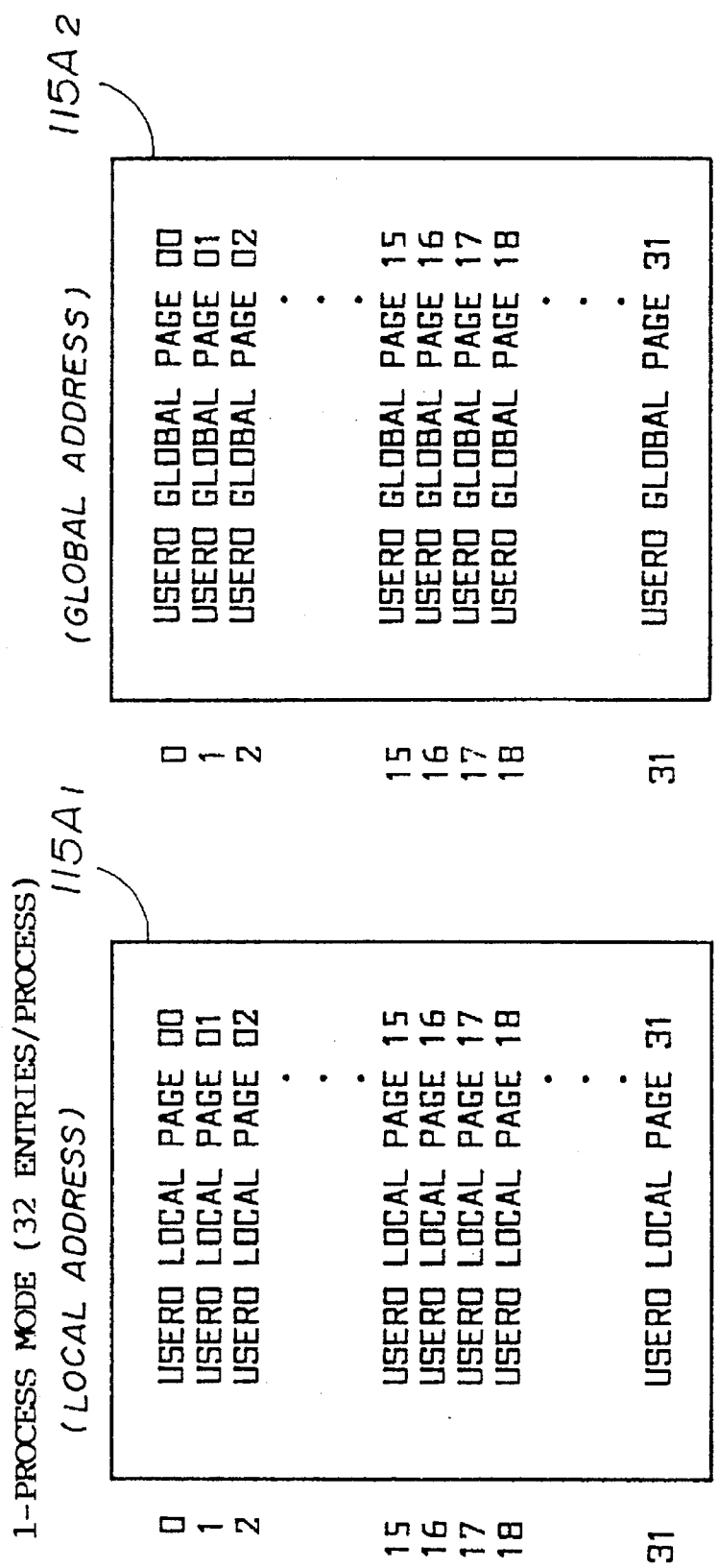
FIG. 7 shows the construction of the address translation table for a case where the page size is 2MB and the transfer mode is 1-process mode.
Figure 8:
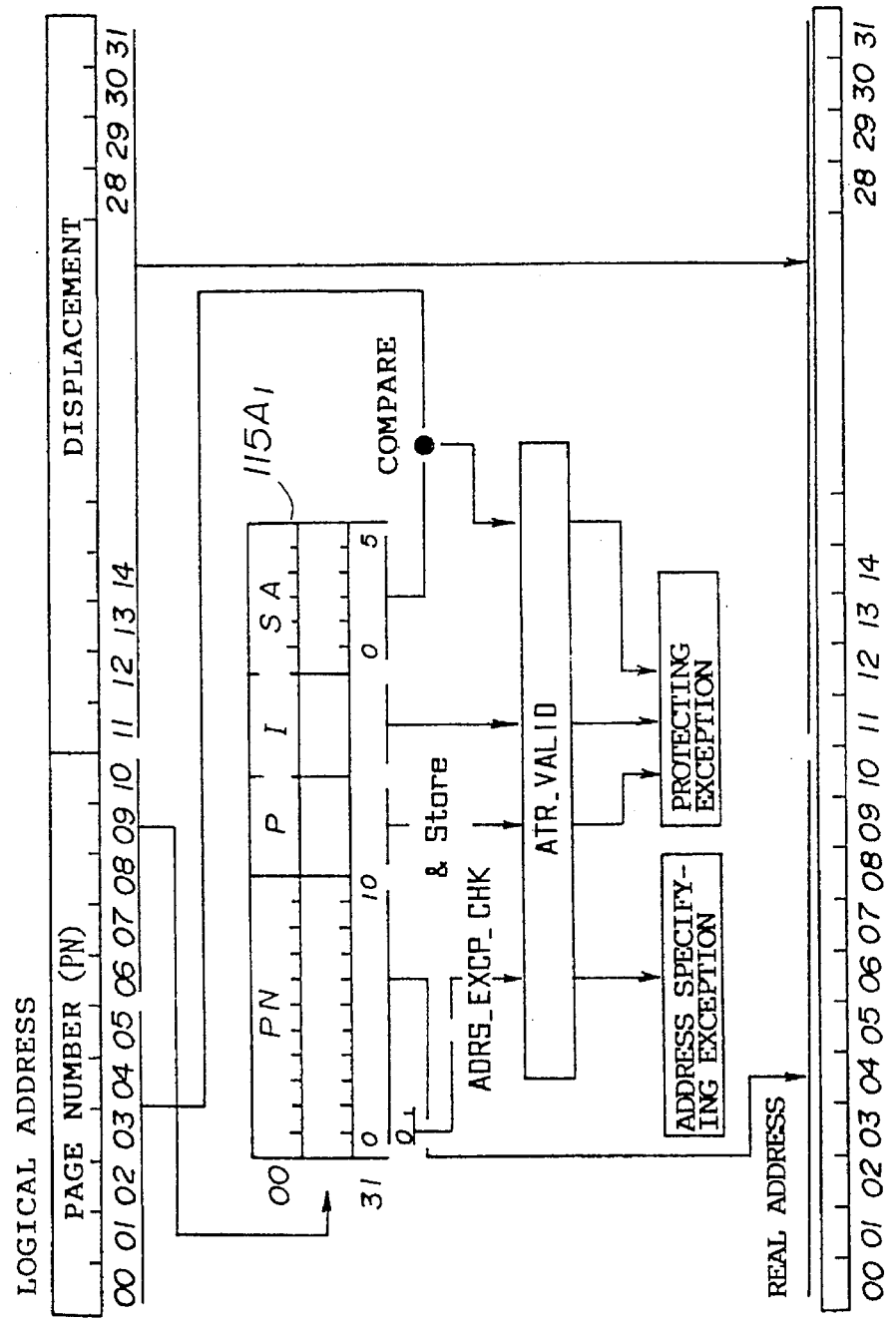
FIG. 8 is a diagram for explaining a local address translation for the case where the page size is 2 MB and the transfer mode is 1-process mode.

FIG. 7 shows the construction of the address translation tables $115A_1$ and $115A_2$ when the page size is 2 MB and the transfer mode is the 1-process (or 1-user) mode. In addition, FIG. 8 is a diagram for explaining the local address translation for this case. The global address translation can easily be understood from the local address translation, and an illustration and description thereof will be omitted in the following description.

When the page size is 2 MB and the transfer mode is the 1-process mode, the 5 bits 06 through 10 of the local virtual address are used to retrieve 1 entry from the 32 entries as shown in FIG. 8. 1 entry includes an 11-bit page number PN, a 1-bit protection bit P, a 1-bit invalid bit I, and a 6-bit section address SA. The 11-bit page number PN of the read entry is used as the read address bits 00 through 10, and a 4-byte local read address is formed by connecting the local virtual address bits 11 through 31 thereafter.

If the protection bit P is "1" and the access with respect to the main storage 13 is a write access, an exception is detected and the write is inhibited. In addition, if the invalid bit I is "1", an exception is detected and the access is inhibited regardless of whether the access with respect to the main storage 13 is a read or write. On the other hand, the section address SA is compared with the bits 00 through 05 of the local virtual address, and the access with respect to the main storage 13 is permitted if the two match while an exception is detected and the access is inhibited if the two do not match. In FIG. 8, ATR-VALID indicates that the address translation table is valid.

FIG. 9 shows the construction of the address translation tables $115A_1$ and $115A_2$ when the page size is 2 MB and the transfer mode is a 2-process (or 2-user) mode. In addition, FIG. 10 is a diagram for explaining the local address translation for this case.

Figure 10:
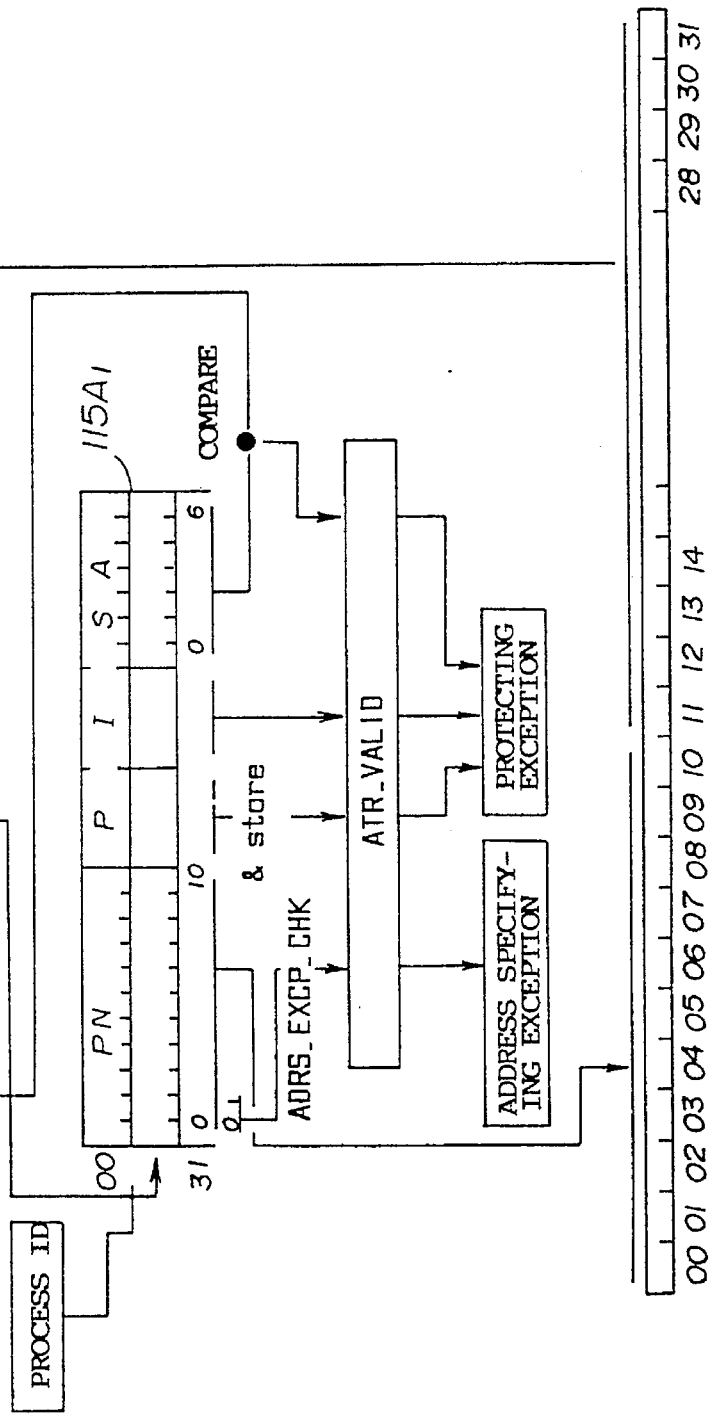
FIG. 10 is a diagram for explaining a local address translation for the case where the page size is 2 MB and the transfer mode is 2-process mode.

When the page size is 2 MB and the transfer mode is the 2-process mode, the 1-bit process ID and the bits 07 through 10 of the local virtual address are connected and used to retrieve 1 entry from the 32 entries as shown in FIG. 10. 1 entry includes an 11-bit page number PN, a 1-bit protection bit P, a 1-bit invalid bit I, and a 7-bit section address SA. The 11-bit page number PN of the read entry is used as the real address bits 00 through 10, and a 4-byte local read address is formed by connecting the local virtual address bits 11 through 31 thereafter.

If the protection bit P is "1" and the access with respect to the main storage 13 is a write, an exception is detected and the write is inhibited. If the invalid bit I is "1", an exception is detected and the access is inhibited regardless of whether the access with respect to the main storage 13 is a read or write. On the other hand, the section address SA is compared with the local virtual address bits 00 through 06, and the access with respect to the main storage 13 is permitted if the two match while an exception is detected and the access is inhibited if the two do not match.

Figure 11:
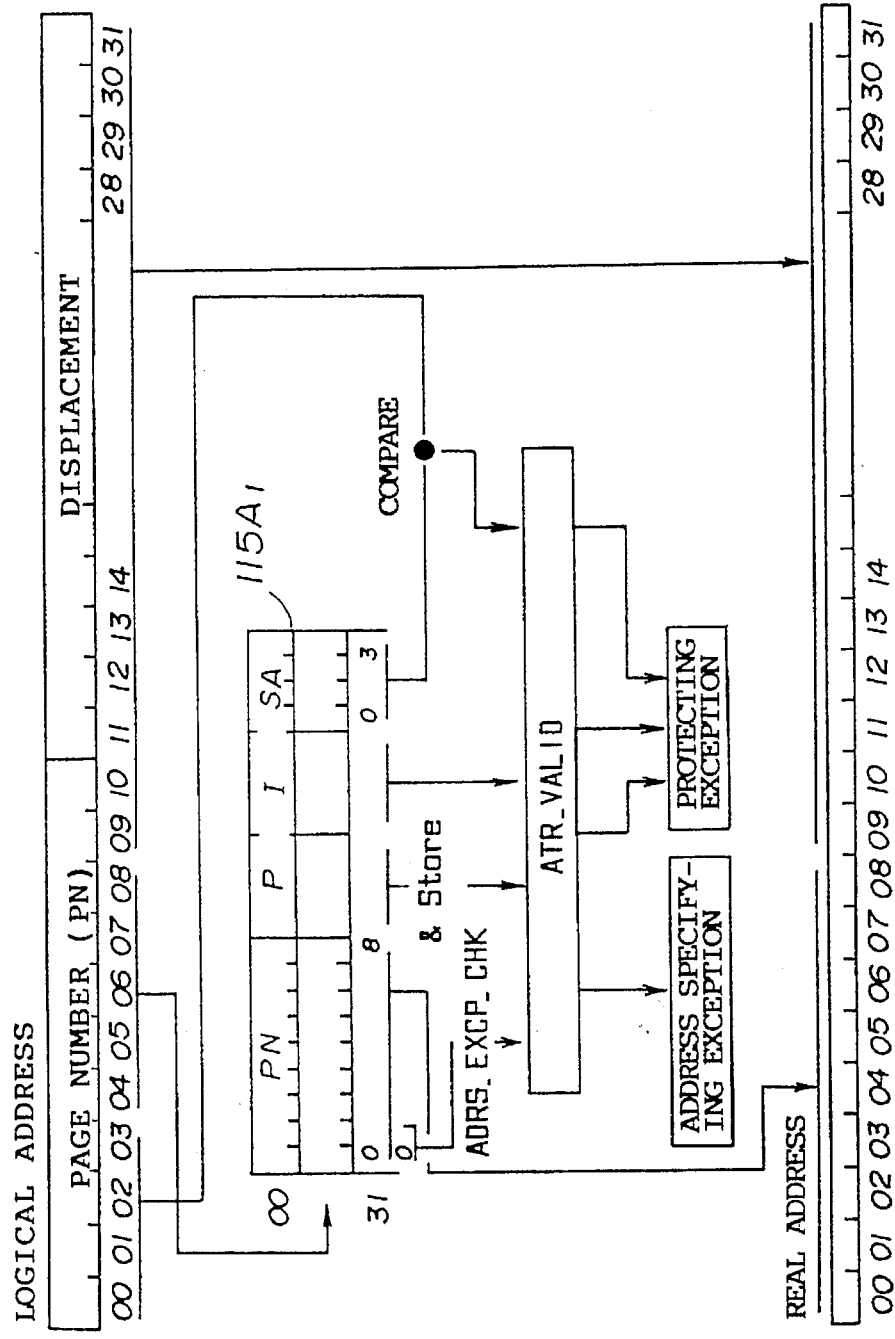
FIG 11 is a diagram for explaining a local address translation for a case where the page size is 8 MB and the transfer mode is 1-process mode.
Figure 12:
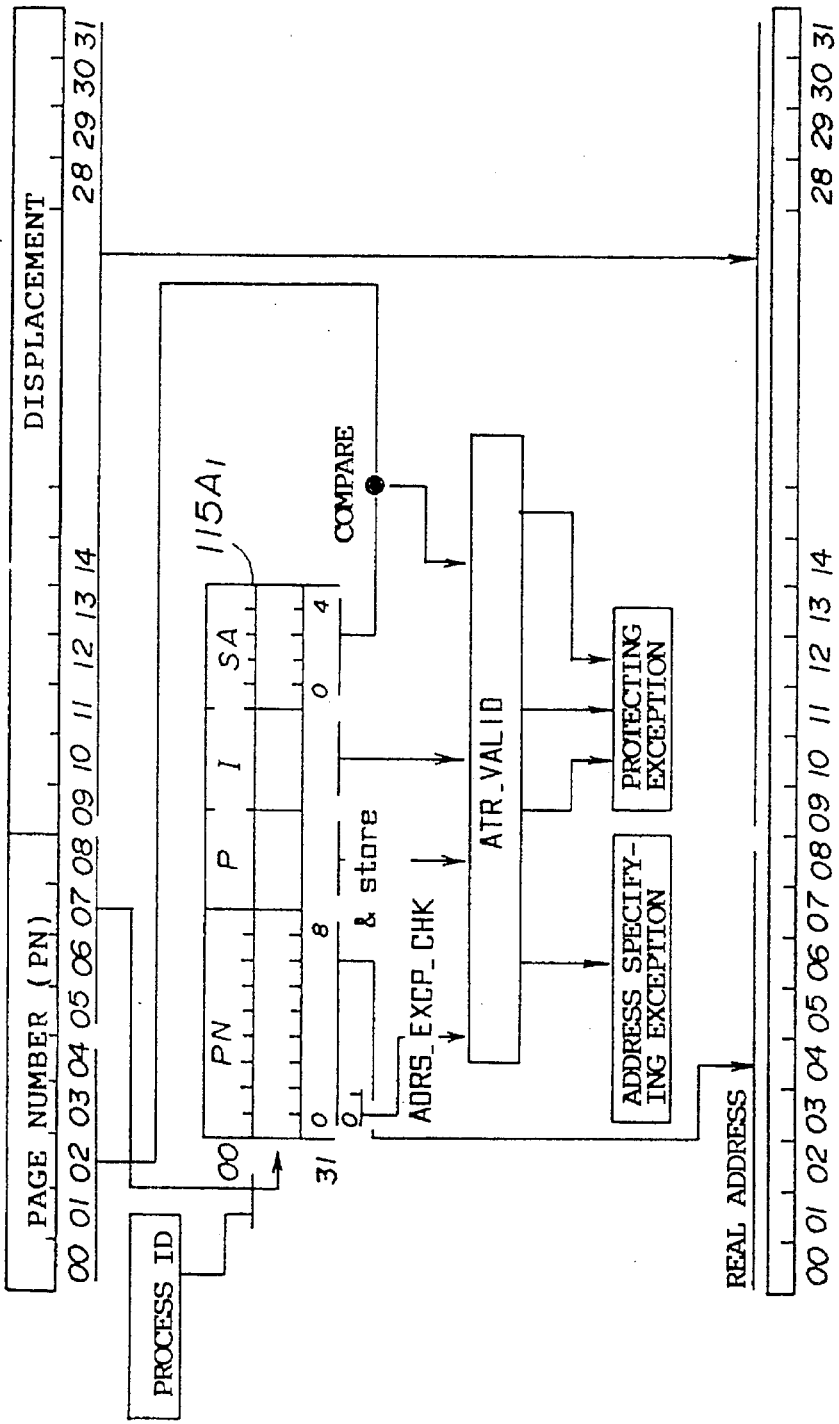
FIG. 12 is a diagram for explaining a local address translation for a case where the page size is 8 MB and the transfer mode is 2-process mode.

FIGS. 11 and 12 respectively are diagrams for explaining the local address translations when the page size is 8 MB and the transfer modes are the 1-process mode and the 2-process mode. In addition, FIGS. 1B and 14 respectively are diagrams for explaining the local address translations when the page size is 32 MB and the transfer modes are the 1-process mode and the 2-process mode. In FIGS. 11 through 14, those parts which are the same as those corresponding parts in FIGS. 8 and 10 are designated by the same reference numerals, and a description thereof will be omitted.

As may be seen from FIGS. 8, 10 and 11 through 14, the number of entries per user is variably set in this embodiment depending on the number of processes with respect to an arbitrary fixed page size. Thus, compared to the case where a number of address translation tables corresponding to the number of users are independently provided, it is possible to reduce the physical quantity of the address translation tables $115A_1$ and $115A_2$.

Returning now to the description of FIG. 3, the supervisor program (operating system) stores the address translation information in the address translation table 115A within the address translator 115, prior to execution of the user program or, dynamically depending on the request of the user program. The user program writes control information of the data transfer request into the main storage 13 in the form of the packet header at a position indicated by (transfer queue base address)+(transfer queue write pointer)x(header length). The control information of the data transfer request includes information specifying the receiving processing unit, the body data length, the transmitting address, the receiving address, the transmitting space ID, the receiving space ID and the like. Then, the user program increments the transfer queue write pointer. Thereafter, the user program repeats the process of writing the control information of the data transfer request and incrementing the transfer queue write pointer, and ends the enqueuing process.

FIG. 15 shows an embodiment of an essential part of the access controller 114. The access controller 114 generally includes registers 141 through 145, an adder 146, a counter 151, a register 152, a comparator 153, and a data buffer controller 161.

The register 141 supplies the space ID from the data buffer 116 (or transfer controller 111) to the address translator 115. The registers 142, 143 and 144 respectively supply the address translation control signal, the process ID and the address translation control signal from the transfer controller 111 to the address translator 115. The register 145 and the adder 146 obtain from the transfer queue base address and the transfer queue read pointer the virtual address which is used to obtain the real address in the main storage 13 of the packet header related to the oldest data transfer request which has not yet been processed, and supply this virtual address to the address translator 115.

The counter 151, the register 152 and the comparator 153 supply a body read end signal to the transfer controller 111 based on the body data length which is obtained from the data buffer 116. Hence, the transfer controller 111 can determined whether or not the transfer of the body data has been completed based on the body read end signal.

The data buffer controller 161 generates a data buffer write signal and a header read end signal based on a main storage read response signal from the data buffer 116. The data buffer write signal is supplied to the data buffer 116 and controls the write to the data buffer 116. On the other hand, the header read end signal is supplied to the transfer controller 111 and notifies the end of the reading of the header.

Next, a description will be given of the general operation of the transfer processor 11 shown in FIG. 3 as a whole.

The transfer controller 111 waits for the enqueuing of the data transfer requests in a state where the transfer controller 111 is activated by the instruction from the instruction processor 12. When the transfer queue read pointer and the transfer queue write pointer of the user USER0 or USER1 no longer match, the transfer controller 111 judges that there exists a data transfer request which has not yet been processed, and starts the data transfer process. Hence, the transfer controller 111 issues a main storage access request to the access controller 114 in order to read the header of the transferring packet.

In response to the main storage access request, the access controller 114 controls the address translator 115 to obtain the real address in the main storage 13 of the packet header of the oldest data transfer request which has not yet been processed, based on the transfer queue base address and the transfer queue read pointer from the register part 112 or 113. In addition, the access controller 114 issues an access request with respect to the main storage 13 via the address translator 115.

When the packet header is read from the main storage 13, the access controller 114 stores this packet header in the data buffer 116, and supplies the header read end signal to the transfer controller 111 so as to notify the end of the reading of the packet header. Thereafter, the access controller 114 reads the transfer mode, the transmitting space ID and the receiving space ID from the data buffer 116, and checks whether or not the data transfer is possible by referring to tables shown in FIGS. 16A through 16D using a permit flag LL from the transfer controller 111 corresponding to the user.

FIGS. 16A through 16D show the tables for determining whether or not to permit the data transfer between the virtual spaces. FIG. 16A shows the table for determining whether or not to permit the data transfer by the user USER0 when the permit flag LL for the user USER0 is "0", and FIG. 16B shows the table for determining whether or not to permit the data transfer by the user USER0 when the permit flag LL for the user USER0 is "1". Similarly, FIG. 16C shows the table for determining whether or not to permit the data transfer by the user USER1 when the permit flag LL for the user USER1 is "0", and FIG. 16D shows the table for determining whether or not to permit the data transfer by the user USER1 when the permit flag LL for the user USER1 is "1". In FIGS. 16A through 16D, G denotes the global address (space), L denotes the local address (space), R denotes a read, and W denotes a write.

If the result of the check made by the access controller 114 indicates that the data transfer is not permitted for the particular combination, the transfer controller 111 inhibits the transfer and notifies the instruction processor 12 of this inhibition by generating an interrupt thereto. On the other hand, if the result of the check indicates that the data transfer is permissible for the particular combination, the access controller 114 further reads from the data buffer 116 the control information which is required for the data transfer, such as the transmitting address and the receiving address. In addition, the access controller 114 controls the address translator 115 to obtain the real address of the packet body in the main storage 13. Furthermore, the access controller 114 makes the read access request with respect to the main storage 13 via the address translator 115.

When the packet body is successively read from the main storage 13, the access controller 114 successively stores the packet body into the data buffer 116, and successively notifies the transfer controller 111 of the amount of the packet body read. The access controller 114 notifies the end of reading the packet body by supplying a body read end signal to the transfer controller 111.

The transfer controller 111 reads the control information of the data transfer request from the data buffer 116 in response to the body read end signal. The transfer controller 111 makes a predetermined check with respect to the control information and writes the control information back into the data buffer 116 after making a predetermined modification to the control information. Then, the transfer controller 111 transmits the packet header from the data buffer 116 to the network 2. In addition, when the amount of the packet body read is successively notified from the access controller 114, the transfer controller 111 successively transmits to the network 2 the amount of the packet body stored in the data buffer 116.

Accordingly, when the transmission of the packet to the network 2 ends, the transfer controller 111 increments the transfer queue read pointer within the register part 112 or 113. In addition, the transfer controller 111 checks the values of the transfer queue read pointer and the transfer queue write pointer within the register part 112 or 113, and starts the next data transfer process if there remains a data transfer request which has not yet been processed. The above described data transfer process is repeated until the values of the transfer queue read pointer and the transfer queue write pointer become the same.

According to this embodiment, the transfer queue base address and the pointers, and the address translation table are provided in correspondence with each user program. Hence, the transfer processor 11 can make a data transfer corresponding to a process ID which is independent of the process ID which is being executed by the instruction processor 12. Moreover, the transfer processor 11 can operate in an asynchronous manner to the instruction processor 12. For this reason, it is possible to improve the operating efficiency of the system by off-loading and executing the data transfer from the instruction processor 12.

In the tables shown in FIGS. 16A through 16D, no data transfer is permitted from the local address space of one processing unit to a local address space of another processing unit for reasons such as facilitating the debugging and the like. However, it is of course not essential to satisfy this condition in this embodiment. In other words, when optimizing the program and executing the program at a high speed, the inhibition of the data transfer from one local address space to another local address space may prevent high-speed execution of the program in some applications. Hence, in such a case, the user is restricted and the permit flag LL is set to "1", so that the data transfer is made possible between two local address spaces. In this case, the overhead of the data transfer is reduced, and it is possible to execute the program at a high speed.

In the description given above, two permit flags LL are used for the user USER0 and the user USER1. However, it should be noted that the number of permit flags LL provided corresponds to the number of users, that is, the number of user programs.

Figure 17:
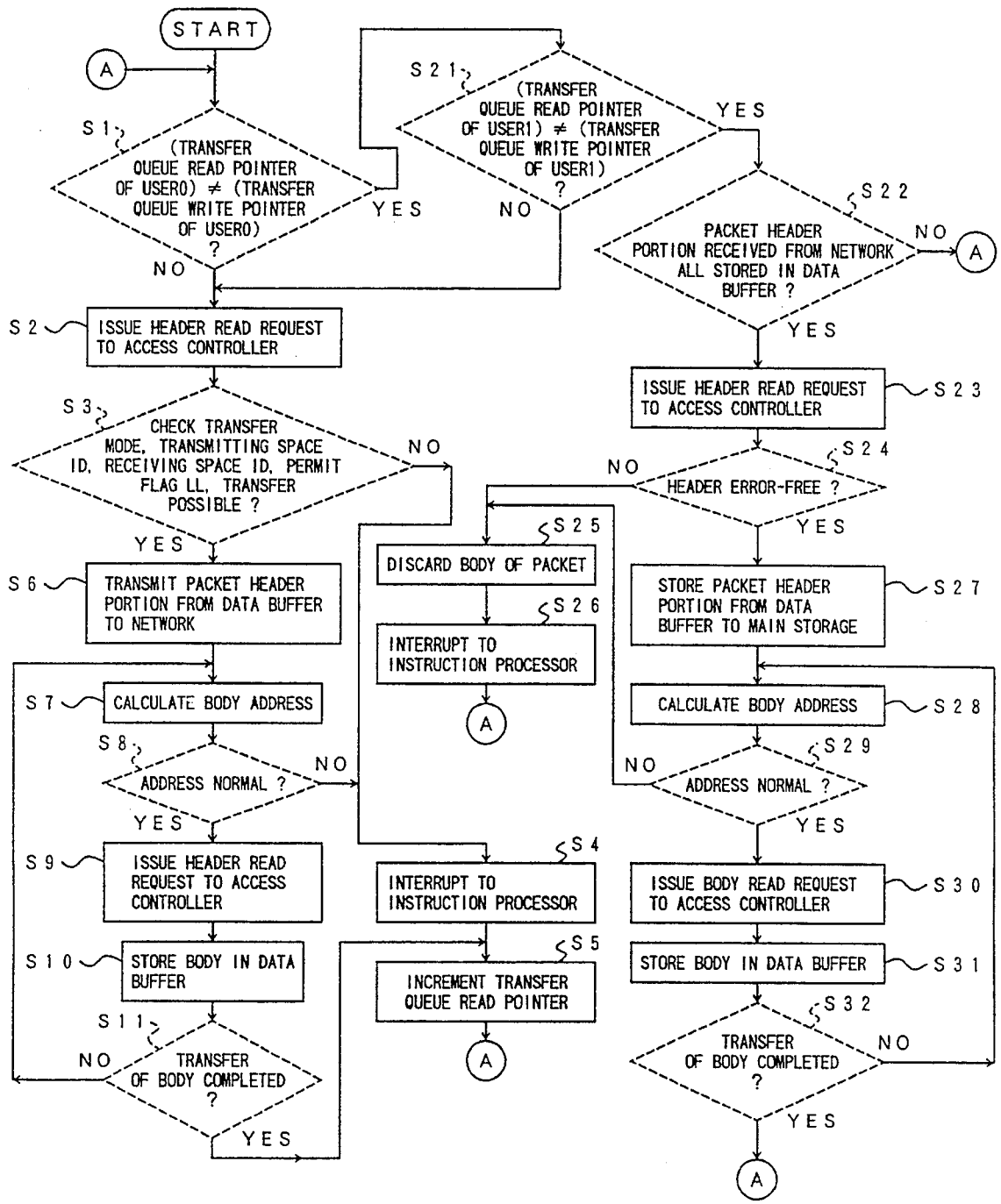
FIG. 17 is a flow chart for explaining the operations of a transfer controller and the access controller of the transfer processor.

In FIG. 3, the functions of the transfer controller 111 and the access controller 114 may be realized by software. FIG. 17 is a flow chart of the software which realizes the functions of the transfer controller 111 and the access controller 114.

In FIG. 17, a step S1 refers to the register part 112 and decides whether or not the values of the transfer queue read pointer and the transfer queue write pointer for the user USER0 match. If the decision result in the step S1 is NO, a step S2 issues a head read request with respect to the access controller 114. A step S3 checks the transfer mode, the transmitting space ID, the receiving space ID and the permit flag LL, and decides whether or not a data transfer is possible.

If the decision result in the step S3 is NO, a step S4 notifies the instruction processor 12 that a data transfer cannot be made by generating an interrupt. In addition, a step S5 increments the transfer queue read pointer within the register part 112, and the process returns to the step S1.

On the other hand, if the decision result in the step S3 is YES, a step S6 transmits the header portion of the packet from the data buffer 116 to the network 2. In addition, a step S7 calculates a body address. A step S8 decides whether or not the body address is normal, and the process advances to a step S4 if the decision result in the step S8 is NO.

If the decision result in the step S8 is YES, a step S9 issues a body read request with respect to the access controller 114. A step S10 stores the body into the data buffer 116. In addition, a step S11 decides whether or not the transfer of the body has been completed. If the decision result in the step S11 is NO, the process returns to the step S7. On the other hand, the process advances to the step S5 if the decision result in the step S11 is YES.

If the decision result in the step S1 is YES, a step S21 refers to the register part 113 and decides whether or not the values of the transfer queue read pointer and the transfer queue write pointer for the user USER1 match. The process advances to the step S2 if the decision result in the step S21 is NO. But the process advances to a step S22 if the decision result in the step S21 is YES. The step S22 decides whether or not all of the header portion of the packet received from the network 2 has been stored in the data buffer 116, and the process returns to the step S1 if the decision result in the step S22 is NO.

On the other hand, if the decision result in the step S22 is YES, a step S23 issues a head read request with respect to the access controller 114. A step S24 checks the header and decides whether or not the header is error-free. If the decision result in the step S24 is NO, a step S25 discards the body of this packet following this erroneous header, and a step S26 generates an interrupt with respect to the instruction processor 12 so as to notify the instruction processor 12 of the erroneous header. The process returns to the step S1 after the step S26 ends.

If the decision result in the step S24 is YES, a step S27 stores the header portion of the packet from the data buffer 116 to the main storage 13. A step S28 calculates a body address, and a step S29 decides whether or not the body address is normal. The process advances to the step S25 if the decision result in the step S29 is NO.

If the decision result in the step S29 is YES, a step S30 issues a body read request with respect to the access controller 114. In addition, a step S31 stores the body into the data buffer 116. A step S32 decides whether or not the transfer of the body has been completed. If the decision result in the step S32 is NO, the process returns to the step S28. On the other hand, the process returns to the step S1 if the decision result in the step S32 is YES.

Figure 18:
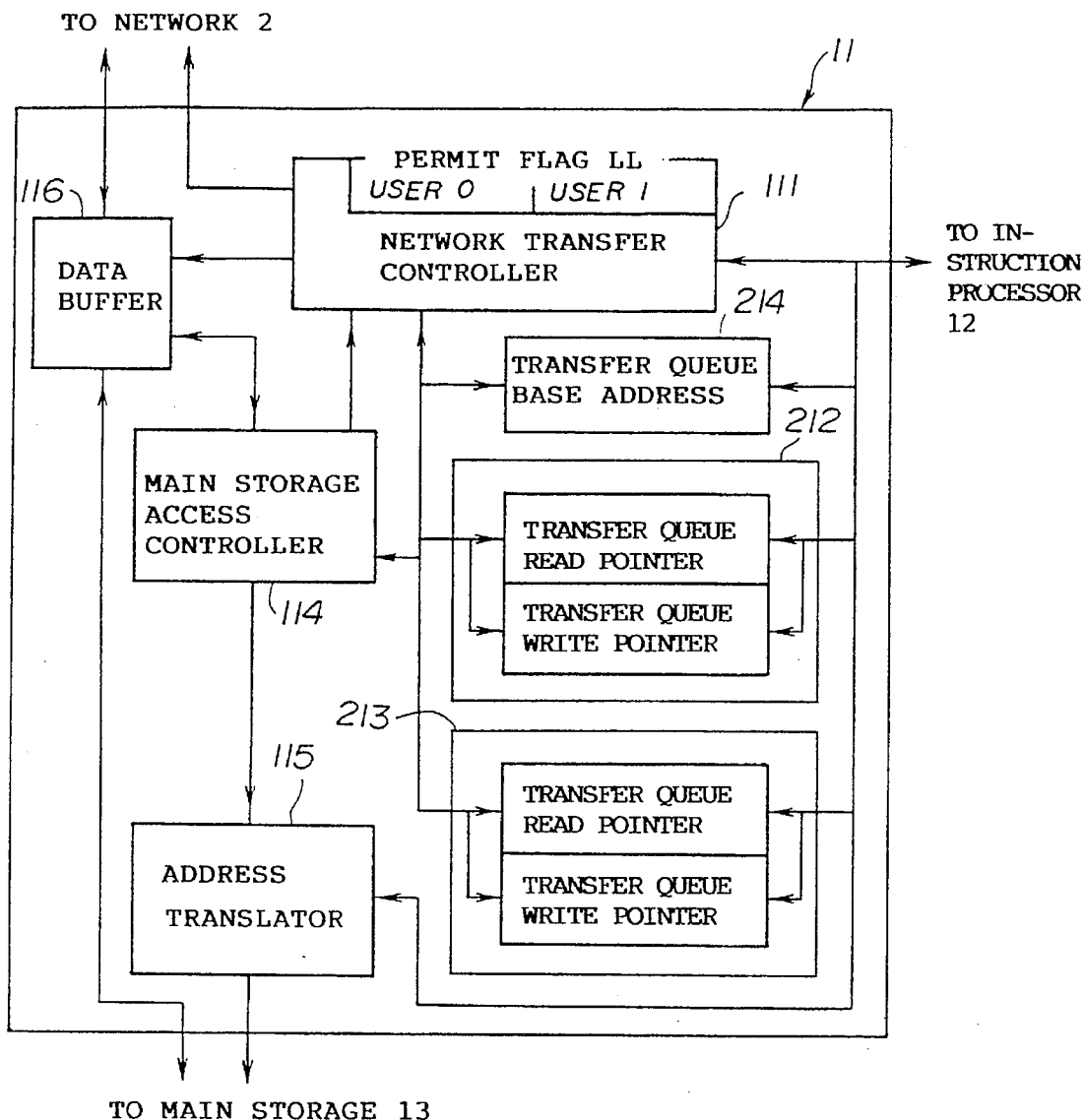
FIG. 18 is a system block diagram showing another embodiment of the transfer processor of the processing unit.

Next, a description will be given of another embodiment of the transfer processor 11, by referring to FIG. 18. In FIG. 18, those parts which are the same as those corresponding parts in FIG. 3 are designated by the same reference numerals, and a description thereof will be omitted.

Figure 19:
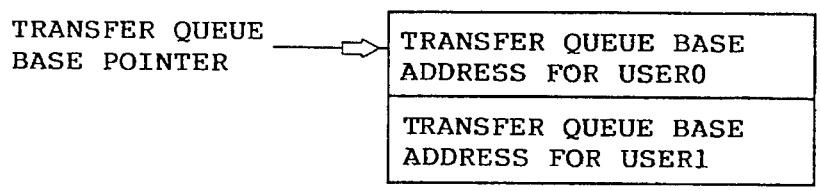
FIG. 19 is a diagram for explaining a transfer queue base address within a main storage.

In FIG. 18, register parts 212 and 213 respectively store only the transfer queue read pointer and the transfer queue write pointer. In addition, a register 214 stores the transfer queue base address. In this embodiment, the transfer queue base address for the user USER0 and the transfer queue base address for the user USER1 are respectively stored in the main storage 13, and a transfer queue pointer indicates the storage locations of these transfer queue base addresses as shown in FIG. 19. The construction and operation of the remaining portions of the transfer processor 11 are the same as those shown in FIG. 3, and a description thereof will be omitted.

Further, the present invention is not limited to these embodiments, but various variations and modifications may be made without departing from the scope of the present invention.

What is claimed is:

1. A parallel processing system adapted to a parallel computer system, said parallel processing system comprising:

a plurality of processing units each having a main storage storing instructions and data, an instruction processor reading the instructions from the main storage and executing the instructions, and a transfer processor for transferring said data from the main storage in units of a packet which is made up of a header and body data; and a network to couple said plurality of processing units to each other, and for each of a plurality of user processes, to enable said transfer processor in one of said plurality of processing units to transfer the data stored in said main storage of said one processing unit to another of said plurality of processing units in response to one of said plurality of user processes and based on information included in the header of the packet, said header including information related to at least a destination of the data, an attribute of a memory access to the main storage and a length of the data, said transfer processor of at least an arbitrary one of said processing units comprising:

managing means for managing a plurality of user queues for each of said plurality of user processes, said plurality of user queues including a transfer queue base address indicating a first address of a transfer queue of said data in the main storage, a transfer queue write pointer indicating to which data transfer request of the transfer queue the instruction processor has enqueued, and a transfer queue read pointer indicating to which data transfer request of the transfer queue the transfer processor has finished the data transfer process, and for managing a memory access virtual space; and address translation means for performing an address translation depending on the memory access virtual space specified by the information included in the header of the packet and for issuing an access address with respect to the main storage, said transfer queue being a list of headers of packets.

2. The parallel processing system as claimed in claim 1, wherein said managing means includes a register part managing the transfer queue base address, the transfer queue write pointer, and the transfer queue read pointer for said each user process.

3. The parallel processing system as claimed in claim 1, wherein said main storage stores the transfer queue base address for said each user process, and said managing means comprises:

a register part managing the transfer queue write pointer and the transfer queue read pointer for said each user process; and a register managing a pointer which indicates a storage location of the transfer queue base address for said each user process within the main storage.

4. The parallel processing system as claimed in claim 1, wherein said address translation means performs the address translation based on an address translation table in which a number of entries are variably set per each said user process depending on the number of said user processes with respect to an arbitrary fixed page size.

5. The parallel processing system as claimed in claim 3, wherein said address translation means performs the address translation based on an address translation table in which a number of entries are variably set per each said user process depending on the number of said user processes with respect to an arbitrary fixed page size.

6. The parallel processing system as claimed in claim 2, wherein said address translation means performs the address translation based on an address translation table in which a number of entries are variably set per each said user process depending on the number of said user processes with respect to an arbitrary fixed page size.

7. The parallel processing system as claimed in claim 1, wherein said managing means provides a plurality of kinds of virtual spaces as the memory access virtual space, and controls permission and inhibition of the data transfer for said each user process depending on the kind of virtual space of the processing units at transmitting and receiving ends.

8. The parallel processing system as claimed in claim 7, wherein said managing means includes a permit flag corresponding to said each user process, and a table which determines whether or not to permit the data transfer between the virtual spaces, said managing means permitting or inhibiting the transfer by referring to said table depending on a transfer mode which is included in the packet header and indicates a kind of access and the kinds of virtual spaces of the processing units at the transmitting and receiving ends.

9. The parallel processing system as claimed in claim 2, wherein said managing means provides a plurality of kinds of virtual spaces as the memory access virtual space, and controls permission and inhibition of the data transfer for said each user process depending on the kind of virtual space of the processing units at transmitting and receiving ends.

10. The parallel processing system as claimed in claim 3, wherein said managing means provides a plurality of kinds of virtual spaces as the memory access virtual space, and controls permission and inhibition of the data transfer for said each user process depending on the kind of virtual space of the processing units at transmitting and receiving ends.

11. The parallel processing system as claimed in claim 4, wherein said managing means provides a plurality of kinds of virtual spaces as the memory access virtual space, and controls permission and inhibition of the data transfer for said each user process depending on the kind of virtual space of the processing units at transmitting and receiving ends.

* * * * *

UNITED STATES PATENT AND TRADEMARK OFFICE
CERTIFICATE OF CORRECTION

PATENT NO. : 5,623,688
DATED : Apr. 22, 1997
INVENTOR(S) : IKEDA et al.

It is certified that error appears in the above-indentified patent and that said Letters Patent is hereby corrected as shown below:

Col. 1,     line 8, change "1995" to --1993--.

Figure 13:
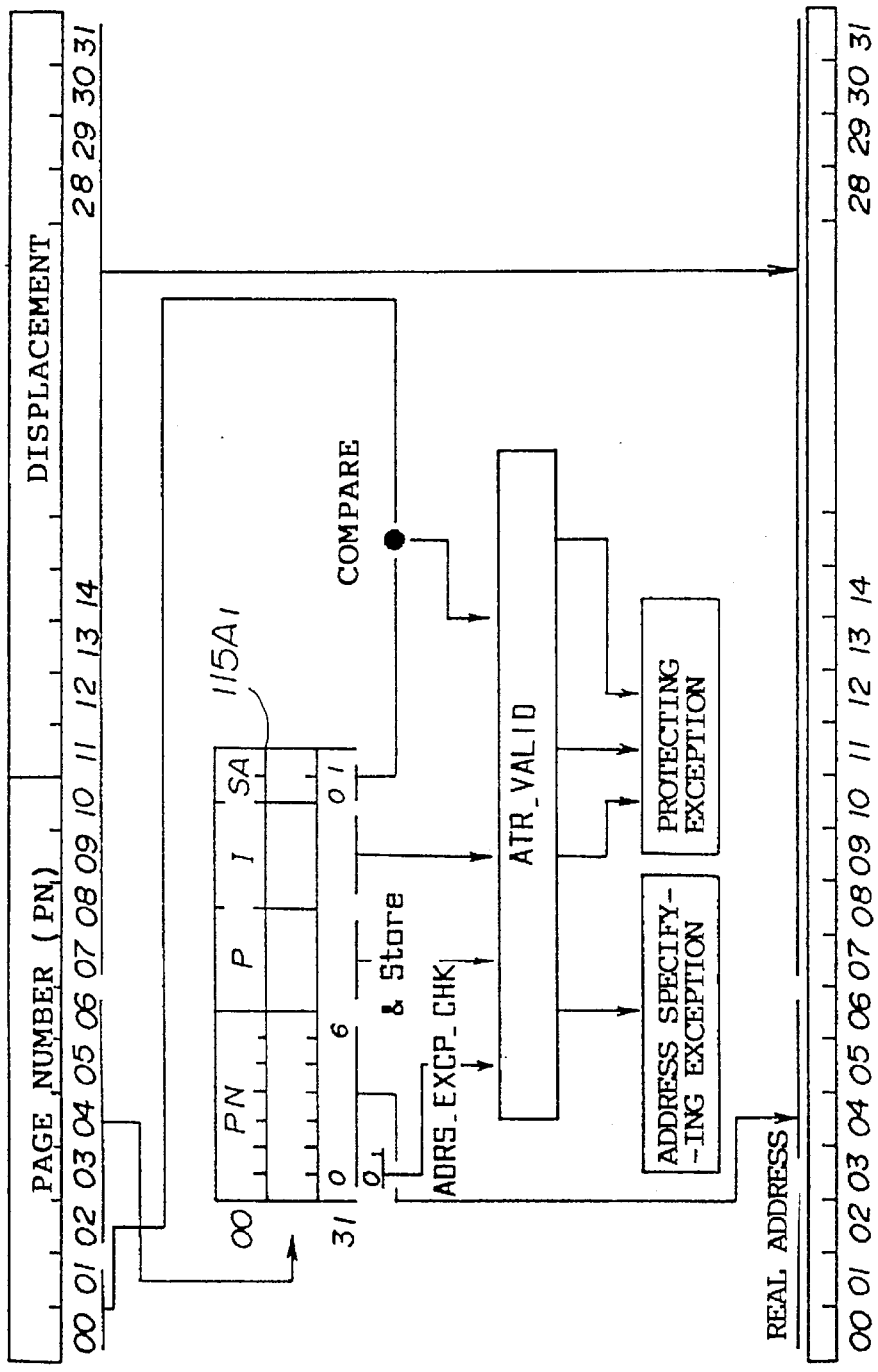
FIG. 13 is a diagram for explaining a local address translation for a case where the page size is 32 MB and the transfer mode is 1-process mode.
Figure 14:
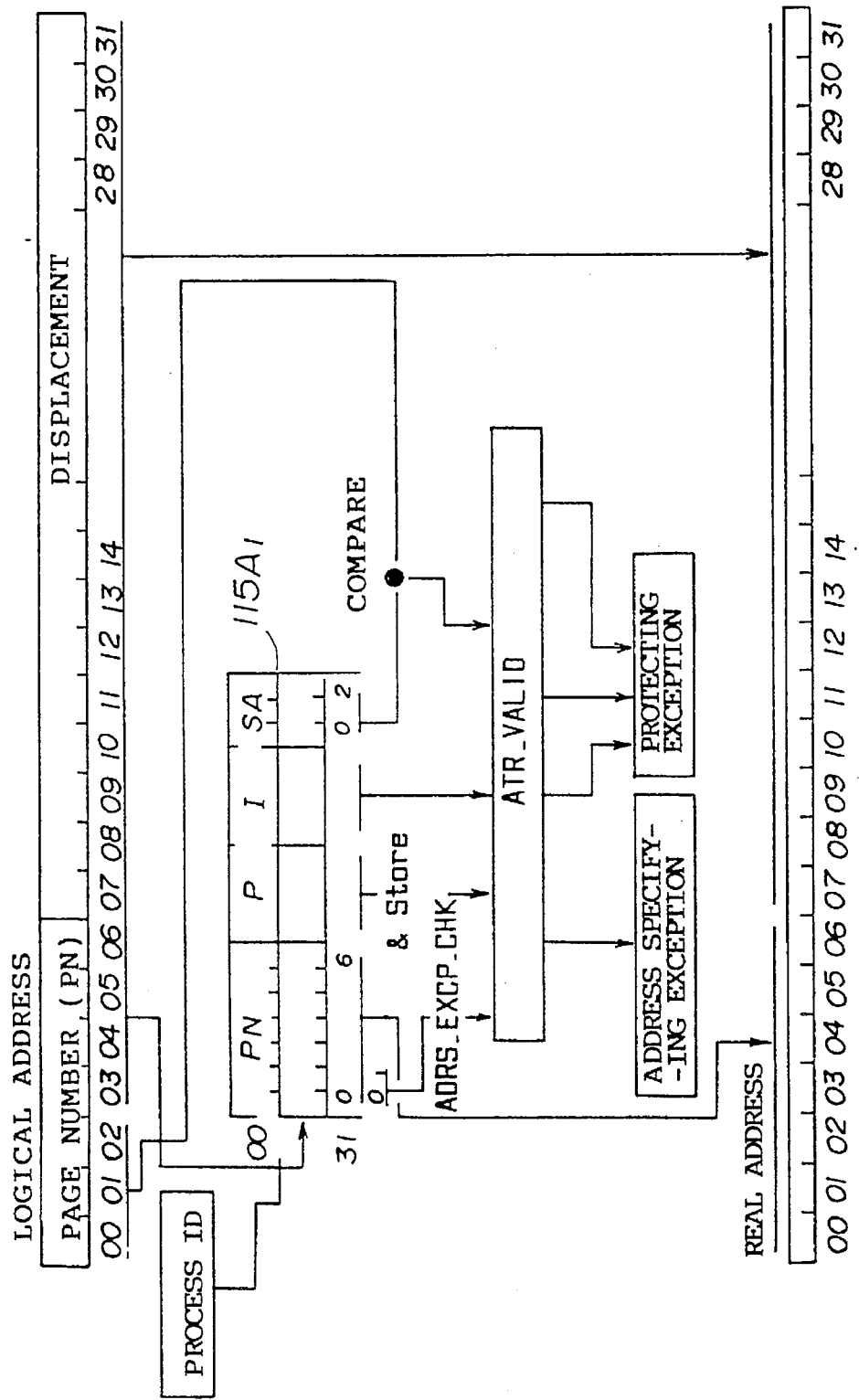
FIG. 14 is a diagram for explaining a local address translation for a case where the page size is 32 MB and the transfer mode is 2-process mode.

Col. 7,     line 4, change "FIGS. 1B and 14" to --FIGS. 13 and 14--.

Signed and Sealed this

Twelfth Day of August, 1997

Attest:

BRUCE LEHMAN

*Attesting Officer*        *Commissioner of Patents and Trademarks*